United States Patent [19]
Rahnke et al.

[11] 3,893,786
[45] July 8, 1975

[54] AIR COOLED SHROUD FOR A GAS TURBINE ENGINE

[75] Inventors: Christian J. Rahnke, Roseville; James K. Vallance, Dearborn Heights, both of Mich.

[73] Assignee: Ford Motor Company, Dearborn, Mich.

[22] Filed: June 7, 1973

[21] Appl. No.: 368,004

[52] U.S. Cl. .................. 415/178; 415/116; 415/138
[51] Int. Cl.² ......................................... F01D 25/08
[58] Field of Search ........... 415/115, 116, 117, 128, 415/136, 138, 175, 177; 416/95, 96; 165/154, 156, 109 T; 60/39.66

[56] References Cited
UNITED STATES PATENTS

| | | | |
|---|---|---|---|
| 2,962,256 | 11/1960 | Bishop | 415/136 |
| 3,365,172 | 1/1968 | McDonough et al. | 415/117 |
| 3,391,904 | 7/1968 | Albert et al. | 415/115 |

*Primary Examiner*—William L. Freeh
*Assistant Examiner*—L. J. Casaregola
*Attorney, Agent, or Firm*—Roger E. Erickson; Keith L. Zerschling

[57] ABSTRACT

An air cooled shroud for a gas turbine engine. Cooling permits reduced clearances between the inner surface of the shroud and the ends of the gasifier turbine rotor blade tips. Air from the compressor is introduced into an annular chamber surrounding the shroud. A band having etched grooves of approximately eight-thousandths of an inch in depth is secured about the shroud wall. Air passing through the grooves sweeps and reduces the boundary layer of heated air at the shroud wall adjacent the rotor periphery and is exhausted into the combustion flow downstream of the gasifier rotor.

7 Claims, 4 Drawing Figures

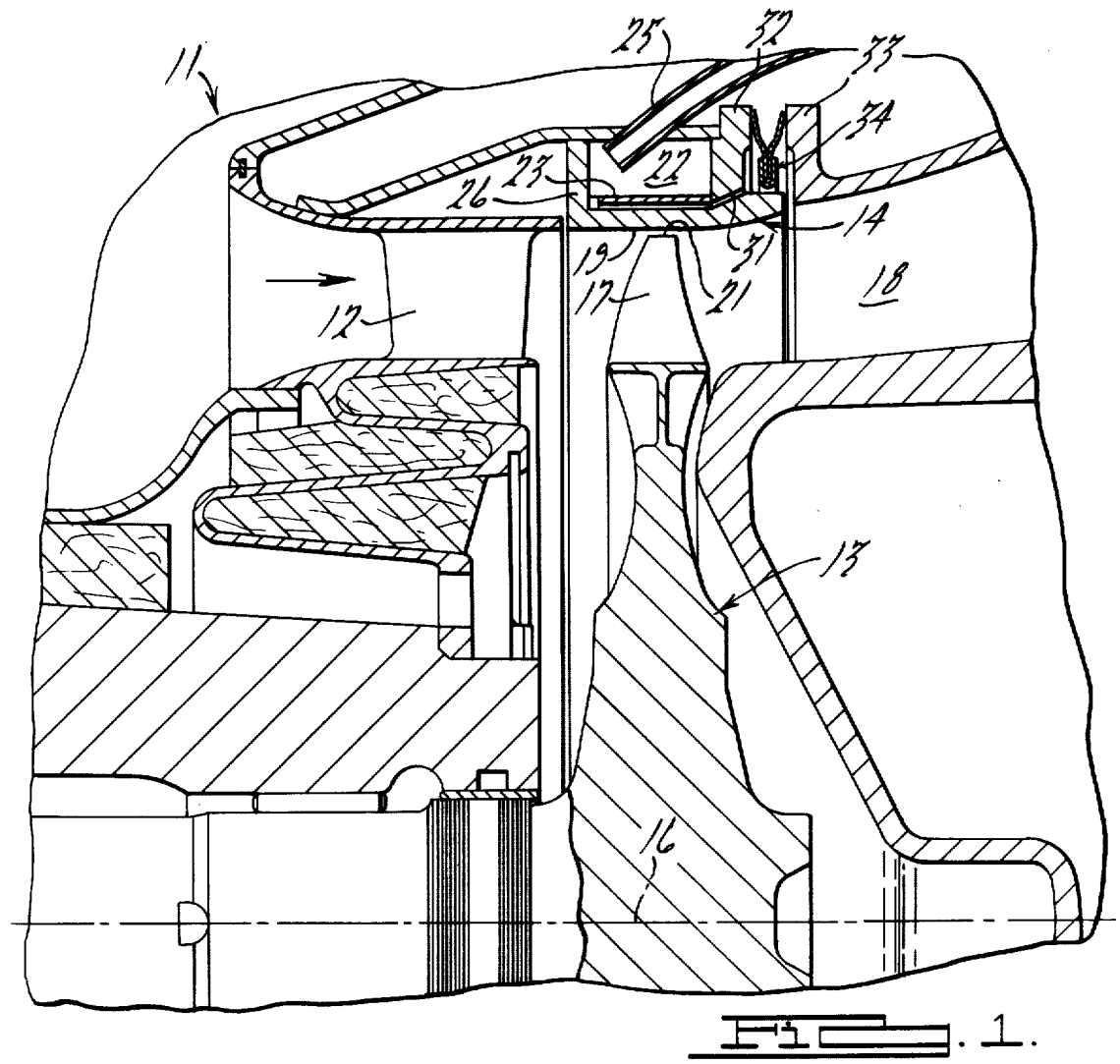

AIR COOLED SHROUD FOR A GAS TURBINE ENGINE

BACKGROUND AND SUMMARY OF THE INVENTION

In a gas turbine engine the clearance between the rotor blade tips and the rotor shroud is critical. The clearance must be sufficient to allow for production tolerances as well as for differences in thermal expansion of the rotor and the shroud. However, at normal operating temperatures for each one-thousandth of an inch of clearance between the rotor blade tips and the shroud, a substantial loss in fuel economy and power output is experienced.

It is an object of this invention to provide an air cooled shroud for a turbine rotor which controls or reduces the thermal expansion of the shroud and results in a reduced clearance between the turbine rotor tips and the shroud during normal operating temperatures. It is a further object of this invention to provide air ducting along the exterior of this shroud wall which results in the sweeping or disturbing of the normal boundary layer of heated air against the wall. It is another object of the invention to provide a shroud cooling means which utilizes the air pressure differentials available within the turbine engine to cause cooling air flow. It is a further object of the invention to provide a shroud cooling construction which is compatible with present turbine engine technology and which is economical to produce and reliable in operation.

A gas turbine engine constructed in accordance with this invention includes a rotor encircled by a shroud. The shroud wall adjacent the rotor tips has a generally annular shape and a radially inwardly facing surface spaced a predetermined clearance distance from the outer circumference of the rotor. A band is positioned about the radially outer surface of the wall and in combination therewith defines a plurality of thin slots. The slots separate a higher pressure volume from a lower pressure volume which results in air movement through the slots during engine operation. The slots have a depth sufficiently shallow so that the air passing therethrough disturbs the normal boundary layer of air against the radially outer surface of the shroud.

BRIEF DESCRIPTION OF THE DRAWINGS

FIG. 1 is a cross sectional view through the axis of a gas turbine engine portion.

FIG. 2 is an enlarged portion of FIG. 1.

FIG. 3 is an elevational view of an uninstalled element of the gas turbine engine taken along line 3—3 of FIG. 2.

FIG. 4 is a cross sectional view of an alternate embodiment of the seal.

DETAILED DESCRIPTION OF THE PREFERRED EMBODIMENT

Reference numeral 11 refers to a position of a gas turbine engine including a nozzle assembly 12, a compressor or gasifier rotor 13 and a shroud assembly 14. The nozzle 12 is at an angle relative to the axis 16 of the rotor and directs a stream of hot gases against the rotor blades 17, such that the momentum of the gases transmits force to the blades causing the rotor to turn about axis 16. The gas passes through passage 18 where it impinges on the power turbine rotor (not shown).

The shroud assembly 14 includes a wall portion 19 that encircles the compressor rotor at a predetermined clearance from the tips 21 of the rotor fins. The shroud structure including wall 19 defines a generally annular chamber 22. A plurality of tubes 25 introduce air into the chamber 22 from the centrifugal compressor discharge area (not shown). At the compressor discharge, the air is at approximately a temperature of 400°F and a pressure of 60 p.s.i.

Circumscribing the shroud wall 19 and received within the annular chamber 22 is a ring or annular band 23. The forward edge of the band is provided with a plurality of evenly spaced inlet recesses 24 providing intermittent spaces between the sidewall 26 of the chamber and the band. From each of the side recesses extends a groove 27 formed in the radial inner surface of the band and traversing the band at an angle. The grooves increase in width from the inlet side of the band to the outlet side. The grooves are preferably of a depth of 0.008 inches but may be of a range from 0.005 to 0.020. The grooves may be formed in the band by electrochemical etching. The band is welded in place about the wall portion 19 of the shroud assembly. The weld is preferably at the rearward, radially outer edge 28 of the band and applied so as to form a seal between the edge 28 and sidewall 29 of the shroud assembly. A number of passages 31 connect the outlets of the grooves with the space between shroud segments 32 and 33. This space experiences a pressure of about 30 p.s.i. at normal operating speeds. Consequently, a pressure differential of approximately 30 p.s.i. exists across grooves 27 resulting in substantial air flow through the grooves against the radially outer surface of the shroud wall portion 19. This movement of air across the shroud surface through grooves of approximately eight-thousandths of an inch in depth results in a sweeping of the shroud wall surface so that the normal boundary layer of air against the wall which acts as an insulator to reduce cooling is disturbed or continually swept away thereby reducing the boundary layer insulating effect and carrying away heated air from the shroud wall. The air flow from passages 31 passes beneath seal member 34 into the combustion flow through passage 18.

The expansion seal assembly 34 is positioned between shroud segments 32 and 33 to accommodate for differing rates or magnitudes of thermal expansion. The shroud components 32 and 33 include annular surfaces 36 and 37, respectively, which are perpendicular to the axis 16. The seal has a generally Y-shaped cross section including a pair of divergent annular leaves 38 and 39 having edges resiliently bearing against the surfaces 36 and 37, respectively. The leaves are clamped between an annular base 41 having a U-shaped cross section. The inside diameter of the seal assembly 34 is greater than the outer diameter of the outer portion 42 of the shroud so that the seal assembly fits loosely about the shroud and permits passage of cooling air from within chamber 22 past the base of the seal assembly, through the clearance space 43 in the shroud and then joined with the combustion gases of the turbine. The regenerator pressure of approximately 60 p.s.i. acts on the radially outer surfaces of the seal assembly, while the combustion passage pressure, typically 30 p.s.i., acts on the base. It, thus, may be seen that pressure differential enhances the sealing between leaves 38 and 39 and the surfaces 36 and 37, respectively.

An alternate embodiment of the seal is shown in FIG. 4 of the drawings. The seal assembly 44 includes divergent annular leaves 48 and 49 corresponding in shape and function to leaves 38 and 39 of the previously described embodiment. The base 51 has a U-shaped portion but includes an axially extending cylindrical flange 52 extending into a circular groove 44 formed in shroud segment 33. The flange 51 acts to locate the seal 44 relative to the shroud assembly 33 and surface 42 and, further, functions to prevent warping or twisting which may result from certain types of thermal expansion and contraction.

Modifications and alterations will occur to those skilled in the art which are included within the scope of the following claims.

We claim:

1. In a gas turbine engine having a rotor and a shroud positioned about said rotor,
    said rotor being rotatable about a given axis,
    said shroud having a generally annular portion encircling said rotor,
    a radially inwardly directed first surface of said annular portion having a predetermined clearance from the outer circumference of said rotor,
    a second surface of said annular portion being the side opposite said first surface,
    means together with said second surface defining a plurality of slots.
    said slots forming a portion of passage means connecting a higher pressure area to a lower pressure area whereby air moves through said slots during engine operation,
    said slots having a depth in a range of 0.005 to 0.020 inches and being sufficiently small so that the air passing therethrough disturbs the normal boundary layer of heated air against said second surface.

2. In a gas turbine engine according to claim 1,
    said first mentioned means comprising a band positioned about said second surface,
    said slots being formed within the radially inner surface of said band and extending from the forward axial edge to the rearward axial edge.

3. In a gas turbing engine having a rotor constructed to rotate about a given axis,
    a shroud assembly positioned about said rotor,
    said shroud assembly constructed to define an annular chamber about said rotor,
    inlet means communicating said chamber with a source of compressed air,
    one wall of said chamber being spaced at a predetermined clearance from the outer circumference of said rotor,
    said wall having radially outwardly directed surface comprising an interior wall of said chamber,
    a band overlying and secured to said surface,
    a plurality of grooves formed in the inner surface of said band extending from one axial side of the band to the other, a plurality of axial recesses formed in one edge of the band providing inlets from the remainder of said chamber to said grooves, said axial recesses and said grooves in cooperation with the contiguous interior surfaces of said chamber defining a plurality of passages,
    outlet means formed in said chamber adjacent said first mentioned chamber wall surface, interposing said inlet means and said outlet means,
    a positive pressure differential existing between said inlet means and said outlet means inducing an air flow through said passages,
    said grooves being sufficiently shallow so that the air flow through said passages disturbs the boundary layer of heated air against said first mentioned chamber wall surface.

4. In a gas turbine engine according to claim 3,
    said grooves having depths in a range of 0.500 to 0.020 inches.

5. In a gas turbine engine according to claim 3,
    said inlet means to said chamber being in communication with a source of centrifugal compressor discharge pressure.

6. In a gas turbine engine according to claim 3,
    said outlet means formed in said chamber being in communication with a source of exhaust pressure downstream of said rotor.

7. In a gas turbine engine according to claim 3,
    said rotor comprising the gasifier rotor of said engine.

* * * * *